(12) United States Patent
Kusunoki

(10) Patent No.: US 11,905,999 B2
(45) Date of Patent: Feb. 20, 2024

(54) CAM CLUTCH

(71) Applicant: TSUBAKIMOTO CHAIN CO., Osaka (JP)

(72) Inventor: Sota Kusunoki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/880,343

(22) Filed: Aug. 3, 2022

(65) Prior Publication Data

US 2023/0043024 A1 Feb. 9, 2023

(30) Foreign Application Priority Data

Aug. 6, 2021 (JP) .................... 2021-129779

(51) Int. Cl.
*F16D 15/00* (2006.01)
*F16D 41/07* (2006.01)
*F16D 41/061* (2006.01)
*F16D 41/08* (2006.01)
*F16D 41/06* (2006.01)

(52) U.S. Cl.
CPC ........... *F16D 15/00* (2013.01); *F16D 41/061* (2013.01); *F16D 41/07* (2013.01); *F16D 41/084* (2013.01); *F16D 2041/0605* (2013.01)

(58) Field of Classification Search
CPC ...... F16D 15/00; F16D 41/061; F16D 41/084; F16D 41/07
USPC .................................... 192/45.1, 47
See application file for complete search history.

(56) References Cited

U.S. PATENT DOCUMENTS 3,279,571 A * 10/1966 Wassilieff ............... F16D 15/00
192/38
2022/0056963 A1 2/2022 Nakagawa et al.

FOREIGN PATENT DOCUMENTS

JP 4-95616 A * 3/1992 ........... F16D 41/061
JP 2020-190255 A 11/2020

* cited by examiner

*Primary Examiner* — Richard M Lorence
(74) *Attorney, Agent, or Firm* — WHDA, LLP

(57) ABSTRACT

To provide a cam clutch easily switchable from a torque transmitting state to a freewheeling state even during torque transmission between race members. The cam clutch includes a plurality of cams set between a first race member and a second race member. The first race member and second race member are spaced away in the axial direction along the rotation axis of the first race member. The plurality of cams are disposed between the first race member and the second race member in the axial direction, and the first race member and the second race member are configured to be able to move relatively closer to and away from each other in the axial direction.

8 Claims, 6 Drawing Sheets

CAM CLUTCH

BACKGROUND OF THE INVENTION

1. Field of the Invention

The present invention relates to a cam clutch.

2. Description of the Related Art

Cam clutches composed of a rotatably arranged first race member, a rotatably arranged second race member coaxial with the first race member, and a plurality of cams disposed between the first race member and the second race member, and configured to transmit torque between the first race member and the second race member via the cams when the first race member and the second race member are rotated relative to each other have been known (see, for example, Japanese Patent Application Publication No. 2020-190255).

The cam clutch disclosed in Japanese Patent Application Publication No. 2020-190255 has one race member (outer ring) and the other race member (inner ring) disposed radially inside the outer ring, with the plurality of cams being set between the one race member (outer ring) and the other race member (inner ring) in the radial direction. The cam clutch is configured to transmit torque between the first race member and the second race member by a change in radial height of the cams when the first race member and the second race member are rotated relative to each other.

SUMMARY OF THE INVENTION

The cam clutch according to Japanese Patent Application Publication No. 2020-190255 has a drawback that, when it is transmitting torque between the first race member and the second race member, it can hardly be switched to a freewheeling state in which no torque is transmitted between the first race member and the second race member. Namely, in the torque transmitting state of the cam clutch according to Japanese Patent Application Publication No. 2020-190255 in which torque is transmitted between the first race member and the second race member, the cams each make tight contact with both race members in the radial direction so that a large friction force is applied between the cams and both race members, which makes it hard to switch to a freewheeling state.

The present invention solves the problem and aims at providing a simple-structured cam clutch easily switchable from a torque transmitting state to a freewheeling state even during torque transmission between race members.

The present invention solves the above problem by providing a cam clutch including: a rotatably arranged first race member; a rotatably arranged second race member coaxial with the first race member; and a plurality of cams disposed between the first race member and the second race member, the first race member and the second race member being spaced away in an axial direction along the rotation axis of the first race member, the plurality of cams being disposed between the first race member and the second race member in the axial direction, the first race member and the second race member being arranged such as to be relatively movable closer to and away from each other in the axial direction.

According to one aspect of the present invention, the first race member and second race member are spaced away in the axial direction along the rotation axis of the first race member. The plurality of cams are arranged between the first race member and the second race member in the axial direction, and the first race member and the second race member are configured to be able to move closer to and away from each other in the axial direction. The first race member and the second race member can be relatively separated in the axial direction without difficulty even during torque transmission between the race members with the cams making contact with both of the first race member and the second race member. Therefore, easy switching from a torque transmitting state to a freewheeling state even during torque transmission between the race members is possible with a simple structure.

According to another aspect of the present invention, a cam cage capable of retaining the plurality of cams is biased toward the first race member so that the cams are each maintained in contact with the first race member. Thus the posture of each cam can be controlled favorably by contact with the first race member.

According to another aspect of the present invention, cam holding parts of the cam cage retaining the cams are configured to receive the cams on one side of the cam cage facing the first race member in the axial direction. Thus the cam cage is simplified in the structure of cam holding parts, while reliably preventing each cam from coming off of the cam cage, by contact with the first race member.

According to another aspect of the present invention, the second race member is configured to be stopped from moving away from the first race member in the axial direction when a second lock engagement part is engaged with a first lock engagement part. At least one of the first lock engagement part and the second lock engagement part is provided such as to be movable in a radial direction perpendicular to the axial direction. Thus it is also possible to releasably and automatically engage the first lock engagement part and the second lock engagement part by an operation of bringing the second race member unit closer to the first race member unit in the axial direction.

According to another aspect of the present invention, a resilient member of the second race member unit has a portion that moves radially when the resilient member undergoes resilient deformation, this portion that moves radially functioning as the second lock engagement part. Thus it is possible to smoothly engage the first lock engagement part and the second lock engagement part by an operation of bringing both race member units closer to each other in the axial direction.

According to another aspect of the present invention, a control spring of the second race member unit includes a first annular part and a second annular part spaced away in the axial direction, and a plurality of bent pieces circumferentially aligned and connecting the first annular part and the second annular part in the axial direction. The control spring is configured to allow each bent piece to move in a radial direction when undergoing resilient deformation, the bent pieces each functioning as the second lock engagement part. Thus the lock mechanism is simplified in the structure, and it is possible to smoothly engage the first lock engagement part and the second lock engagement part by an operation of bringing both race member units closer to each other in the axial direction.

According to another aspect of the present invention, between the second race member making contact with the plurality of cams and a control member that engages with the first lock engagement part of the first race member unit is provided a bias unit biasing the second race member and the control member away from each other. This allows the second race member to make contact with the plurality of cams stably and evenly.

DESCRIPTION OF THE PREFERRED EMBODIMENTS

A cam clutch 10 that is one embodiment of the present invention is described below with reference to the drawings.

Figure 1:
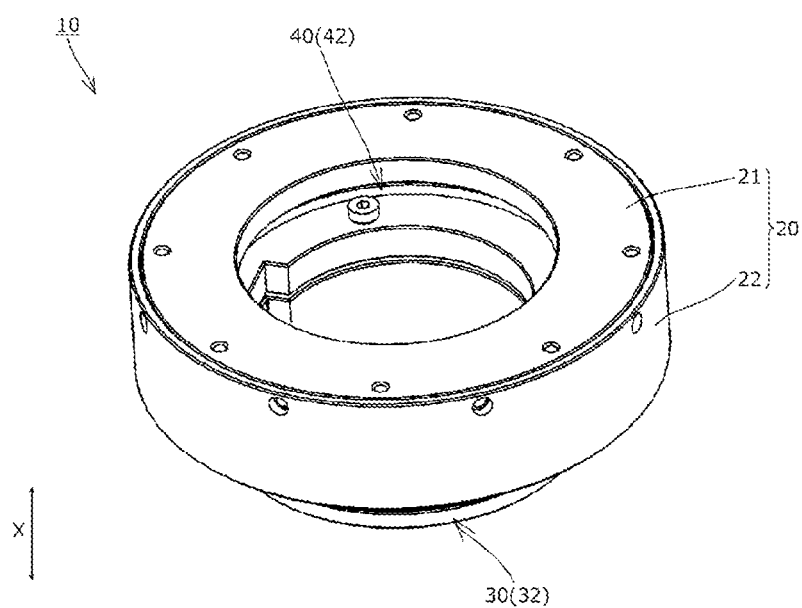
FIG. 1 is a perspective view illustrating a cam clutch according to one embodiment of the present invention.
Figure 2:
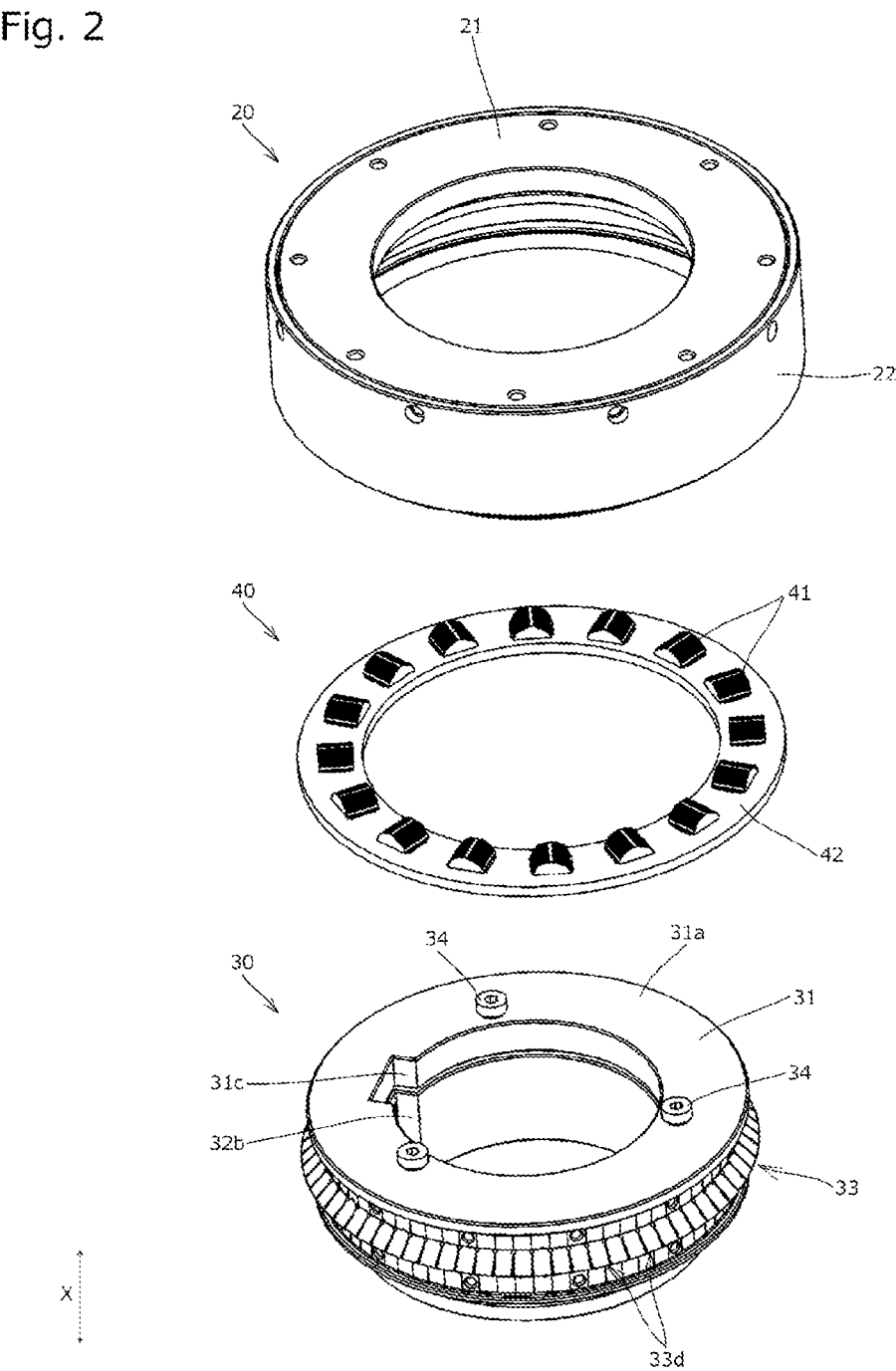
FIG. 2 is an exploded perspective view of the cam clutch.

The cam clutch 10 is incorporated in an automobile or the like and includes, as shown in FIG. 1 and FIG. 2, a rotatably arranged first race member 21, a rotatably arranged second race member 31 coaxial with the first race member 21, and a plurality of cams 41 disposed between the first race member 21 and the second race member 31, so as to transmit torque of an input shaft (not shown) connected (directly or indirectly) to one of the first race member 21 and the second race member 31 to an output shaft (not shown) connected (directly or indirectly) to the other one of the first race member 21 and the second race member 31. These various parts of the cam clutch 10 are made of metal.

Hereinafter, each of the components of the cam clutch 10 will be described.

The cam clutch 10 includes a first race member unit 20 having a first race member 21, a second race member unit 30 having a second race member 31, and a cam unit 40 having cams 41, as shown in FIG. 2.

Figure 3:
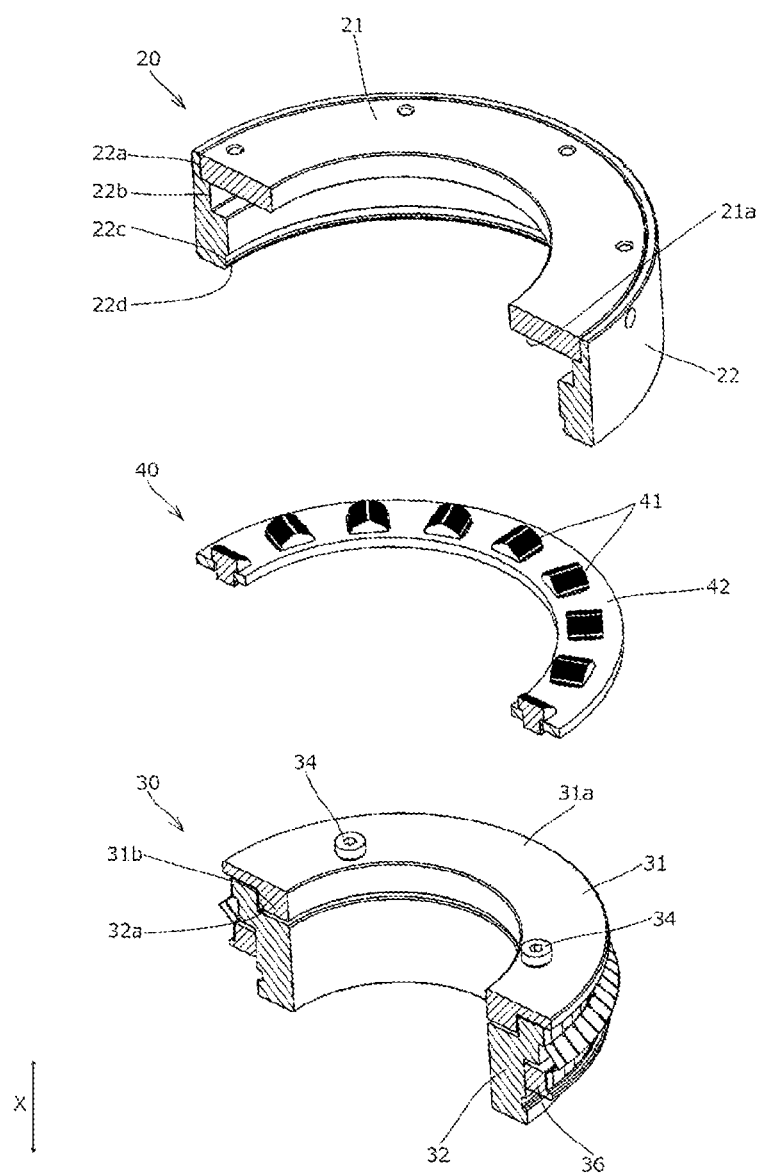
FIG. 3 is an exploded perspective view with a cross section of the cam clutch.

The first race member unit 20 includes the first race member 21 that is annular and a tubular casing 22 fixed to the first race member 21 as shown in FIG. 2 and FIG. 3.

The first race member 21 is a circular disc part having a through hole in the center extending in an axial direction X along the rotation axis of the first race member 21 (and second race member 31) as shown in FIG. 2 and FIG. 3.

Figure 6:
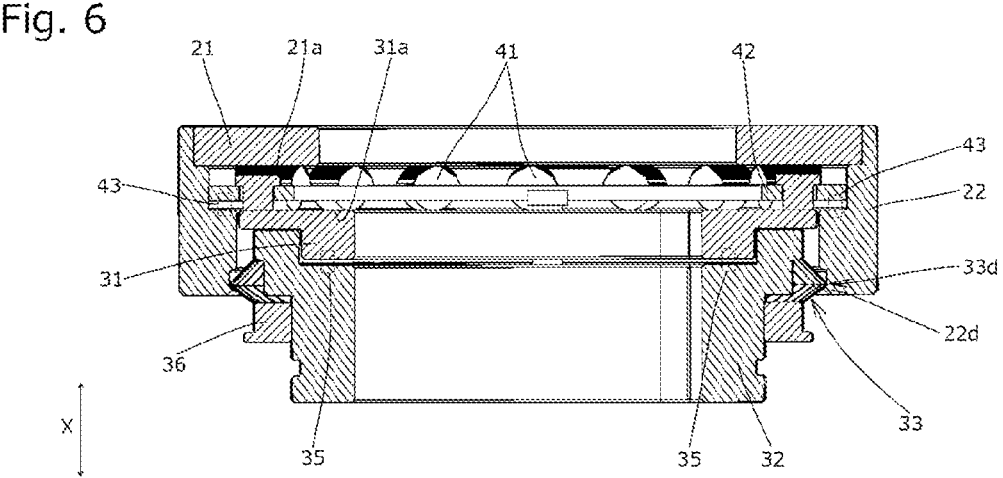
FIG. 6 is a cross-sectional view of a state in which the second race member is in contact with cams.

The first race member 21 has a first raceway 21a disposed opposite the cams 41 in the axial direction X, on the side facing the second race member 31 as shown in FIG. 3 and FIG. 6. The first raceway 21a is an annular flat surface having the rotation axis of the first race member 21 as the center.

The casing 22 is tubular (cylindrical). On its inner wall, from the side facing the first race member 21 sequentially (from the top downward in FIG. 3), the casing includes an annular race member recess 22a for the first race member 21 to be set in, an annular cam recess 22b for a cam cage 42 to be described later to be set in, a spring recess 22c for a control spring 33 to be described later to be set in, and a first lock engagement part 22d that is annular and protruded to engage with a second lock engagement part 33d of the control spring 33 as shown in FIG. 3.

The input shaft (not shown) or output shaft (not shown) mentioned above is connected to at least one of the first race member 21 and the casing 22. In this embodiment, the shaft is connected to the first race member 21.

Figure 4:
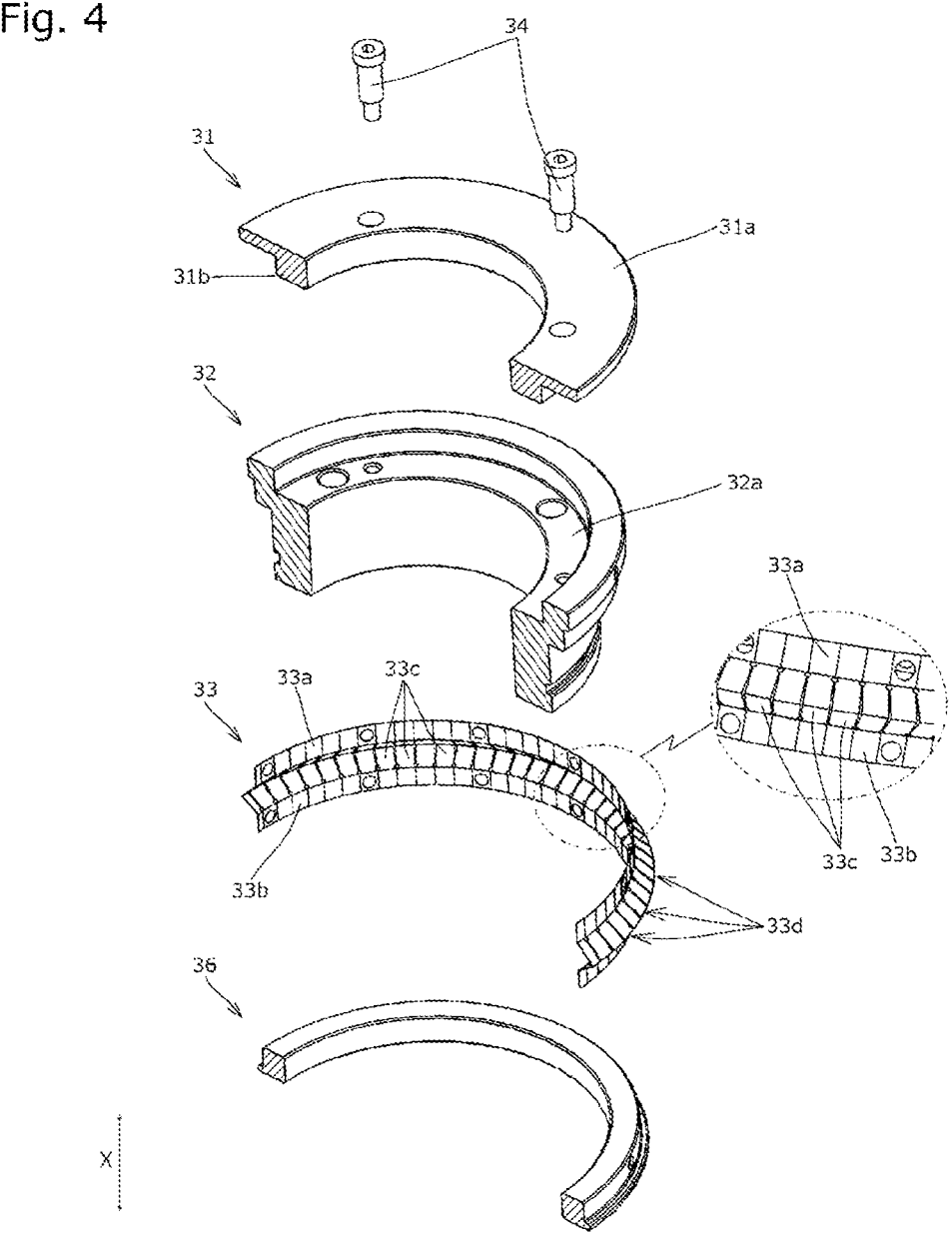
FIG. 4 is an exploded perspective view with a cross section of a second race member unit.

The second race member unit 30 includes, as shown in FIG. 3 and FIG. 4, the second race member 31 that is annular and spaced away from the first race member 21 in the axial direction X, a control member 32 set on the rear side (lower side in FIG. 3 and FIG. 4) opposite from the front side that faces the first race member 21 in the axial direction X, an annular control spring 33 disposed around the control member 32 and serving as a resilient control member 33, bolts 34 for attaching the second race member 31 to the control member 32, a bias spring 35 (shown in FIG. 6 and FIG. 7) set between the second race member 31 and the control member 32, and an annular selector member 36 set around the control member 32.

Figure 7:
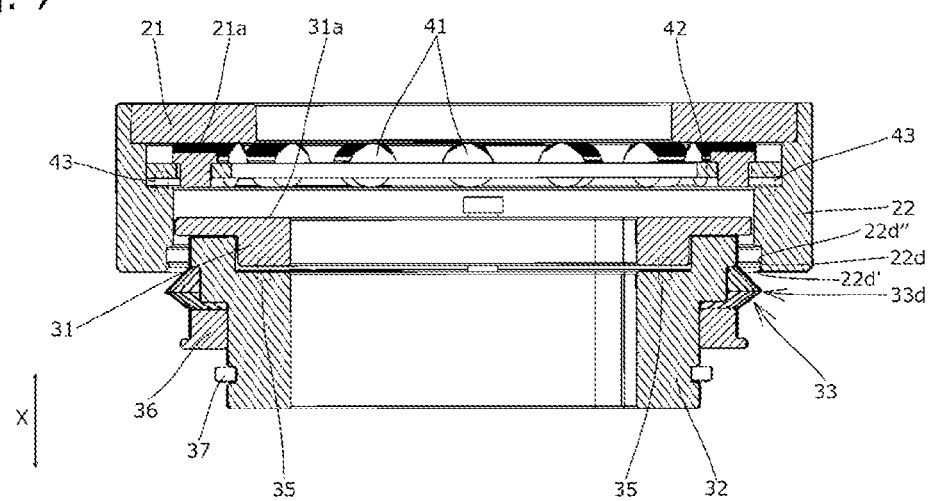
FIG. 7 is a cross-sectional view of a state in which the second race member is separated from the cams.

The entire second race member unit 30 including the second race member 31 is configured to be movable to and from the first race member unit 20 including the first race member 21 in the axial direction X as can be seen from FIG. 6 and FIG. 7.

The second race member 31 is a circular disc part having a through hole extending in an axial direction X in the center as shown in FIG. 3 and FIG. 4.

The second race member 31 is movable in the axial direction X a predetermined distance relative to the control member 32 as shown in FIG. 3 and FIG. 4, and attached to the control member 32 by the bolts 34 in a manner that stops the second race member 31 from rotating relative to the control member 32. More specifically, the bolts 34 are loosely inserted into bolt holes formed in the second race member 31, with the bolt shafts fixed to the control member 32 and the bolt heads set on the second race member 31 on the side facing the first race member 21 as shown in FIG. 4. The bolts thus prohibit the second race member 31 from rotating relative to the control member 32, and the bolt heads of the bolts 34 restrict the movement of the second race member 31 relative to the control member 32 toward the first race member 21 in the axial direction X within a predetermined distance.

The second race member 31 has an annular protrusion 31b protruding toward the control member 32 as shown in FIG. 3 and FIG. 4, and this annular protrusion 31b is set in a race member recess 32a formed on the control member 32. This restricts radial movement of the second race member 31 relative to the control member 32.

The second race member 31 has a second raceway 31a disposed opposite the cams 41 in the axial direction X, on the side facing the first race member 21, as shown in FIG. 3 and FIG. 4. The second raceway 31a is an annular flat surface having the rotation axis of the second race member 31 (first race member 21) as the center.

A key groove 31c is formed in the inner circumferential surface of the second race member 31 as shown in FIG. 2, for a key of the input shaft (not shown) or output shaft (not shown) mentioned above to engage with.

The control member 32 is a tubular (substantially cylindrical) part having a through hole extending in the axial direction X in the center as shown in FIG. 3 and FIG. 4.

The control member 32 has the race member recess 32a on the side facing the second race member 31 as shown in FIG. 3 and FIG. 4, in which the annular protrusion 31b of the second race member 31 is set.

A key groove 32b is formed in the inner circumferential surface of the control member 32 as shown in FIG. 2, for a key of the input shaft (not shown) or output shaft (not shown) mentioned above to engage with.

The resilient control member 33 has a portion that moves radially when the resilient control member undergoes resilient deformation. This radially moving portion functions as the second lock engagement part 33d. In this embodiment, the resilient control member 33 is formed as the control spring 33.

To be more specific, the control spring 33 of this embodiment is a plate spring, and includes, as shown in FIG. 4, a first annular part 33a circumferentially continuous in a ring-like form and fixed to the control member 32, a second annular part 33b circumferentially continuous in a ring-like form and fixed to the selector member 36, and a plurality of bent pieces 33c (bent in a dogleg shape) circumferentially aligned and connecting, in the axial direction X, the first annular part 33a and the second annular part 33b that are spaced away in the axial direction X. The control spring 33 is configured to allow each bent piece 33c to move in the radial direction when undergoing resilient deformation.

The plurality of bent pieces 33c adjoin circumferentially with slits therebetween as shown in FIG. 4. A movement of the selector member 36 (second annular part 33b) relative to the control member 32 (first annular part 33a) in the axial direction X changes the bending angle of each bent piece 33c, this change of angle translating to a radial movement of the bent pieces 33c that function as the second lock engagement part 33d as will be described later.

The bent pieces 33c that function as the second lock engagement part 33d are configured to abut on the first lock engagement part 22d of the first race member unit 20 when the second race member unit 30 is moved closer to the first race member unit 20 in the axial direction X from the state shown in FIG. 7, and to move radially inward, pressed by the first lock engagement part 22d.

While the first lock engagement part 22d is described above as annular and protruding from the inner circumferential wall of the casing 22, the first lock engagement part 22d need not be circumferentially continuous. There may be provided a plurality of circumferentially arranged first lock engagement parts 22d.

The bias spring 35 is a coil spring, as shown in FIG. 6 and FIG. 7, set between the second race member 31 and the control member 32 in a compressed state and operable as a biasing unit to bias the second race member 31 and the control member 32 away from each other.

While the input shaft (not shown) or output shaft (not shown) mentioned above is passed through the through holes of the second race member 31 and the control member 32 and connected to both of the second race member 31 and the control member 32 in this embodiment, the input shaft (not shown) or output shaft (not shown) may be connected in any manner, such as for example connected to only one of the second race member 31 and the control member 32.

Figure 5:
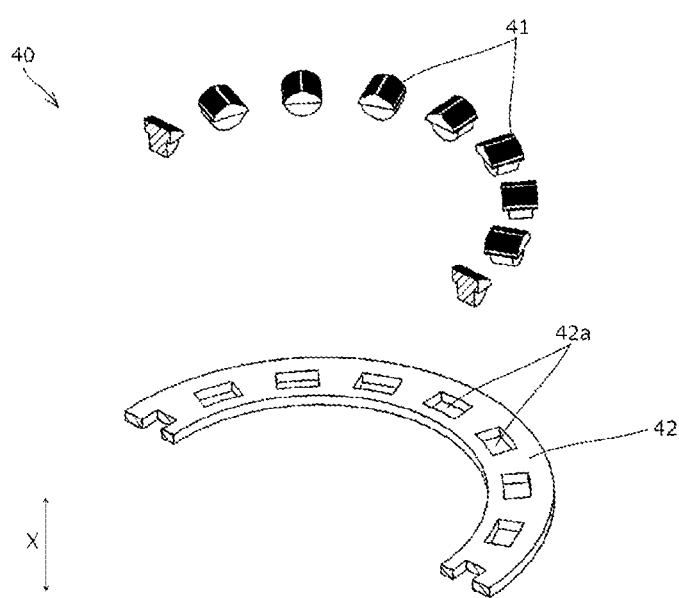
FIG. 5 is an exploded perspective view with a cross section of a cam unit.

The cam unit 40 includes a plurality of cams 41 set between the first race member 21 and the second race member 31 in the axial direction X as shown in FIG. 3 and FIG. 5, an annular cam cage 42 configured to hold the plurality of cams 41, and a posture retaining spring 43 (shown in FIG. 6 and FIG. 7).

The plurality of cams 41 held in the cam cage 42 are aligned in a ring shape (circumferentially) around the rotation axis of the first race member 21 (and second race member 31) between the annular first raceway 21a and the annular second raceway 31a in the axial direction X as shown in FIG. 3 and FIG. 6.

The cams 41 are held in the cam cage 42 such that each of them can roll (tilt) around an axis not parallel to the axial direction X (in this embodiment, an axis along a radial direction of the first race member 21 and second race member 31 perpendicular to the axial direction X).

In this embodiment, all the cams 41 have the same shape. The cams 41 are each configured such that, in the state in which they are held between the first race member 21 and second race member 31 in the axial direction X, when the first race member 21 and second race member 31 are rotated relative to each other, either in one direction or in the other direction, the cams roll by contact (friction or frictional engagement) with the first raceway 21a and second raceway 31a, whereby the height of the cams 41 changes in the axial direction X (increases from that of a neutral state to be described later) so that the cams 41 provide a wedging action as struts between the first raceway 21a and second raceway 31a to transmit torque between the first race member 21 and the second race member 31.

The cam cage 42 is a circular disc part having a through hole in the center extending in the axial direction X along the rotation axis of the first race member 21 (and second race member 31) as shown in FIG. 2 and FIG. 5.

The cam cage 42 has a plurality of circumferentially spaced cam holding parts 42a that extend through the cam cage in the axial direction X for holding the cams 41 as shown in FIG. 2 and FIG. 5.

Each of the cam holding parts 42a is configured to receive a cam 41 from one side of the cam cage 42 in the axial direction X facing the first race member 21 as shown in FIG. 2 and FIG. 5. Each cam 41 held in each cam holding part 42a is supported by each cam holding part 42a such as to be able to come off on the side facing the first race member 21, but to be stopped from coming off on the side facing the second race member 31.

The posture retaining spring 43 is set between the casing 22 and the cam cage 42 in a compressed state as shown in FIG. 6 and FIG. 7 so that it biases the cam cage 42 toward the first race member 21 in the axial direction X. This way, each cam 41 is maintained (always) in contact with the first raceway 21a of the first race member 21, which maintains the posture of each cam 41 in a neutral state (where the height of the cams 41 in the axial direction X is lower than that when the cams 41 provide a wedging action as struts between the raceways 21a and 31a so that torque is transmittable between the raceways 21a and 31a).

The cam clutch 10 includes a lock mechanism for releasably locking the first race member 21 and second race member 31 at spaced positions in the axial direction X in a state in which the cams 41 are held between the first race member 21 and the second race member 31 so that torque is transmittable between the first race member 21 and the second race member 31.

The lock mechanism includes, as shown in FIG. 6 and FIG. 7, the first lock engagement part 22d of the first race member unit 20, and the second lock engagement part 33d of the second race member unit 30 that can engage with the first lock engagement part 22d. The engagement between the first lock engagement part 22d and the second lock engagement part 33d stops the second race member 31 from moving away from the first race member 21 in the axial direction X, i.e., maintains the state in which the first raceway 21a and second raceway 31a are in contact with the cams 41.

In this embodiment, the second lock engagement part 33d is composed of the bent pieces 33c of the control spring 33 as shown in FIG. 4 and FIG. 6, and the second lock engagement part 33d is configured to move in a radial direction perpendicular to the axial direction X with the movement of the selector member 36 (second annular part 33b) relative to the control member 32 (first annular part 33a) in the axial direction X.

Next, how the cam clutch 10 according to this embodiment works will be described.

FIG. 7 shows the cam clutch 10 in a state in which no torque is transmitted between the first race member 21 and the second race member 31 (freewheeling state). In the state shown in FIG. 7, the first race member 21 and second race member 31 are spaced away in the axial direction X, and the second raceway 31a of the second race member 31 is not touching the cams 41. In this state shown in FIG. 7, the cam cage 42 is biased by the posture retaining spring 43 so that each cam 41 is in contact with the first raceway 21a of the first race member 21.

To change the state shown in FIG. 7 to a torque transmitting state where torque is transmittable between the first race member 21 and the second race member 31, a drive unit (not shown) separate from the cam clutch 10 is used to cause the first race member 21 and second race member 31 to move closer to each other in the axial direction X so that the second raceway 31a of the second race member 31 makes contact with the plurality of cams 41.

At this time, the bent pieces 33c of the control spring 33 serving as the second lock engagement part 33d abut on the first lock engagement part 22d of the first race member unit 20. The bent pieces 33c move radially inward by resilient deformation and ride over the first lock engagement part 22d toward the first race member 21 (upward in FIG. 7). The bent pieces 33c, having ridden over the first lock engagement part 22d, move radially outward by resilient restoration to an engaging position where they can engage the first lock engagement part 22d. The second lock engagement part 33d thus engages with the first lock engagement part 22d automatically to stop the second race member 31 from moving away from the first race member 21 in the axial direction X.

In this embodiment, various parts of the cam clutch 10 are configured such that the engagement of the second lock engagement part 33d with the first lock engagement part 22d is completed after the second raceway 31a has come into contact with the cams 41. Instead, the various parts of the cam clutch 10 may be configured such that the engagement of the second lock engagement part 33d with the first lock engagement part 22d is completed at the same time when the second raceway 31a comes into contact with the cams 41.

To allow the bent pieces 33c of the control spring 33 to smoothly ride over the first lock engagement part 22d in the axial direction X, an inclined surface (tapered surface 22d') that reduces in diameter upward is provided below the first lock engagement part 22d (on the side facing the second race member unit 30) as shown in FIG. 7.

In this state, the second race member 31 is movable in the axial direction X relative to the control member 32, and the bias spring 35 set between the second race member 31 and the control member 32 enables the plurality of cams 41 to smoothly make contact with the second raceway 31a of the second race member 31. Therefore, when operating the second race member unit 30 by use of the drive unit (not shown) mentioned above, it is preferable to drive the control member 32 rather than the second race member 31.

Next, as shown in FIG. 6, the first race member 21 and second race member 31 rotate relative to each other (in other words, the input shaft rotates), with the cams 41 held between the first race member 21 and the second race member 31 in the axial direction X, which causes the cams 41 to roll by friction (frictional engagement) with the first raceway 21a and second raceway 31a, whereby the height of the cams 41 changes (increases) in the axial direction X so that torque can be transmitted between the first race member 21 and the second race member 31.

The relative rotation of the first race member 21 and second race member 31 (i.e., rotation of the input shaft) may be started (i.e., the input shaft may be rotated) before the cams 41 are held between the first race member 21 and the second race member 31. Alternatively, the first race member 21 and second race member 31 may not be rotated relative to each other before the cams 41 are held between the first race member 21 and the second race member 31, i.e., the relative rotation of the first race member 21 and second race member 31 may be started only after the cams 41 are held between the first race member 21 and the second race member 31.

To change the torque transmitting state where torque is transmittable between the first race member 21 and the second race member 31 to a state in which no torque is transmitted between the first race member 21 and the second race member 31 (freewheeling state), first, the second lock engagement part 33d is disengaged from the first lock engagement part 22d.

To disengage the second lock engagement part 33d from the first lock engagement part 22d, the selector member 36 is moved relative to the control member 32 away from the first race member 21 (downward in FIG. 6) by use of an operation unit (not shown) that is provided separately from the cam clutch 10, so as to cause the bent pieces 33c of the control spring 33 serving as the second lock engagement part 33d to move radially inward and ride over the first lock engagement part 22d.

To allow the bent pieces 33c of the control spring 33 to smoothly ride over the first lock engagement part 22d in the axial direction X, an inclined surface (tapered surface 22d'') that reduces in diameter downward is provided above the first lock engagement part 22d (on the side facing the first lock engagement part 22d) as shown in FIG. 7.

Simultaneously or after the disengagement of the second lock engagement part 33d from the first lock engagement part 22d, the state in which no torque is transmitted between the first race member 21 and the second race member 31 (freewheeling state) as shown in FIG. 7 can be achieved by then moving the first race member 21 and the second race member 31 away from each other in the axial direction X (moving the second race member 31 away from the cams 41) by way of a drive unit (not shown) separate from the cam clutch 10.

In the operation of moving the selector member 36 by way of the operation unit (not shown) mentioned above away from the first race member 21 (downward in FIG. 6), the entire second race member unit 30 including the second race member 31 may be moved in the axial direction X. In this case, as shown in FIG. 7, a movement restricting protrusion 37 may be provided on the outer circumference of the control member 32 below the selector member 36 (away from the first race member 21) for the selector member 36 moved downward to abut on. In the case where such a movement restricting protrusion 37 is provided, after the selector member 36 is moved downward and has abutted on the movement restricting protrusion 37, the control member 32 can be moved downward by an operation of moving the selector member 36 downward via the movement restricting protrusion 37. While the movement restricting protrusion 37 in the example shown in FIG. 7 is in the form of a ring fitted on the outer circumference of the control member 32, the movement restricting protrusion 37 may take any concrete form as long as the selector member 36 that is moved down will abut on it.

The operation of changing the torque transmitting state where torque is transmittable between the first race member 21 and the second race member 31 to the state in which no torque is transmitted between the first race member 21 and the second race member 31 (freewheeling state) described above may be performed during torque transmission between the first race member 21 and the second race member 31, or with the first race member 21 and the second race member 31 being stopped from rotating relative to each other.

While one embodiment of the present invention has been described in detail, the present invention is not limited to the above-described embodiment and may be carried out with various design changes without departing from the scope of the present invention set forth in the claims. For example, various features of the embodiment and variation examples described above or below may be combined as desired to configure another cam clutch 10.

For example, the first race member 21 and the second race member 31 in the embodiment described above are in an annular (ring-like) form with a through hole in the center. The through hole need not necessarily be formed, i.e., the first race member 21 and second race member 31 need not necessarily have an annular (ring-like) shape.

In the embodiment described above, each cam 41 is kept in contact with the first raceway 21a of the first race member 21 even in the freewheeling state. Instead, the cam clutch 10 may be configured such that each cam 41 does not contact either of the first raceway 21a of the first race member 21 and the second raceway 31a of the second race member 31 in the freewheeling state.

In the embodiment described above, all the cams 41 have the same shape, and the cams 41 are each configured such that, in the state in which they are held between the first race member 21 and second race member 31, when the first race member 21 and second race member 31 are rotated relative to each other, either in one direction or in the other direction, the cams roll, whereby the height of the cams 41 changes (increases) in the axial direction X to transmit torque between the first race member 21 and the second race member 31.

Instead, at least some of the plurality of cams 41 (e.g., half of the cams 41) may be configured such as to roll when the first race member 21 and second race member 31 are rotated relative to each other in one direction, whereby the height of the cams 41 changes (increases) in the axial direction X to transmit torque between the first race member 21 and the second race member 31, while at least some of the plurality of cams 41 (e.g., the remaining half of the cams 41) may be configured such as to roll when the first race member 21 and second race member 31 are rotated relative to each other in the other direction, whereby the height of the cams 41 changes (increases) in the axial direction X to transmit torque between the first race member 21 and the second race member 31.

Alternatively, all the cams 41 may be configured such as to roll, in the state where they are held between the first race member 21 and second race member 31, only when the first race member 21 and second race member 31 are rotated relative to each other in one direction, whereby the height of the cams 41 changes (increases) in the axial direction X to transmit torque between the first race member 21 and the second race member 31, i.e., the cam clutch 10 may be configured as a one-way clutch.

The cams 41 and cam cage 42 are not limited to those described above (shown in FIG. 5) and may take any concrete forms (such as the shapes of the cams 41 and cam cage 42 or the manner in which the cams 41 are held by the cam cage 42), i.e., the cam clutch may be configured as a sprag clutch, for example.

In the embodiment described above, the lock mechanism for releasably locking the first race member 21 and second race member 31 at spaced positions in the axial direction X is made up of the first lock engagement part 22d of the first race member unit 20 and the second lock engagement part 33d of the second race member unit 30 that is movable in the radial direction. Instead, a lock mechanism can be configured by providing at least one of the first lock engagement part 22d and the second lock engagement part 33d such as to be movable in the radial direction.

If the first lock engagement part 22d is to be provided such as to be movable in the radial direction, the first lock engagement part 22d should preferably be biased (by one or a plurality of resilient members such as a spring or rubber, either integral with or separate from the first lock engagement part 22d) toward an engaging position where it can engage the second lock engagement part 33d (to be able to spring back to the engaging position).

If the second lock engagement part 33d is to be provided such as to be movable in the radial direction, the second lock engagement part 33d should preferably be biased (by one or a plurality of resilient members such as a spring or rubber, either integral with or separate from the second lock engagement part 33d) toward an engaging position where it can engage the first lock engagement part 22d (to be able to spring back to the engaging position).

To be more specific, the resilient control member 33, which was described in the above embodiment as being a control spring 33 shown in FIG. 4 having the second lock engagement part 33d, may take any concrete form as long as it includes a portion that moves radially by resilient deformation and serves as the second lock engagement part 33d, such as a spring or rubber member having an annular second lock engagement part 33d that undergoes resilient deformation such as to radially contract or expand, i.e., it may for example be a synthetic rubber ring or the like attached on the outer periphery of the control member 32. The resilient control member 33 is not necessarily limited to one component. A plurality of the resilient control members 33 having a second lock engagement part 33d may be provided.

The plurality of cams 41 were described above as being aligned in a ring shape around the rotation axis of the first race member 21 (and second race member 31) between the annular first raceway 21a and the annular second raceway 31a in the axial direction X as shown in FIG. 3 and FIG. 6. The arrangement of cams 41 is not limited to that of the above embodiment. For example, a plurality of annular rows of circumferentially arranged cams 41 may be radially aligned (i.e., two or more rows of cams 41 may be radially aligned).

What is claimed is:

1. A cam clutch comprising: a rotatably arranged first race member; a rotatably arranged second race member coaxial with the first race member; and a plurality of cams disposed between the first race member and the second race member, the first race member and the second race member being spaced away in an axial direction along a rotation axis of the first race member, the plurality of cams being disposed between the first race member and the second race member in the axial direction, the first race member and the second race member being arranged such as to be relatively movable closer to and away from each other in the axial direction, the cam clutch comprising a first race member unit having the first race member, and a second race member unit having the second race member, the first race member unit including a first lock engagement part, the second race member unit including a second lock engagement part capable of engaging with the first lock engagement part, the second race member being configured to be stopped from moving away from the first race member in the axial direction when the second lock engagement part is engaged with the first lock engagement part, at least one of the first lock engagement part and the second lock engagement part being provided such as to be movable in a radial direction perpendicular to the axial direction.

2. The cam clutch according to claim 1, wherein the first race member includes a first raceway formed in an annular shape around the rotation axis of the first race member on a side facing the second race member, the second race member includes a second raceway formed in an annular shape around a rotation axis of the second race member on a side facing the first race member, and the plurality of cams are aligned in an annular shape around the rotation axis of the first race member between the annular first raceway and the annular second raceway.

3. The cam clutch according to claim 1, wherein the cams are each designed such that, in a state in which the cams are held between the first race member and the second race member in the axial direction, when the first race member and the second race member are rotated relative to each other, either in one direction or in the other direction, the cams roll, thereby changing a height in the axial direction to be able to transmit torque between the first race member and the second race member.

4. The cam clutch according to claim 1, further comprising a cam cage capable of holding the plurality of cams, the cam cage being biased toward the first race member so that the cams are each maintained in a state in contact with the first race member.

5. The cam clutch according to claim 4, wherein the cam cage includes a plurality of cam holding parts each holding a respective one of the cams, the cam holding parts being configured to receive the cams on one side of the cam cage facing the first race member in the axial direction.

6. The cam clutch according to claim 1, wherein the second race member unit includes a resilient control member, the resilient control member having a portion that moves radially when the resilient control member undergoes resilient deformation, the portion that moves radially functioning as the second lock engagement part.

7. The cam clutch according to claim 6, wherein the second race member unit includes a control spring as the resilient control member, the control spring including a first annular part and a second annular part spaced away in the axial direction, and a plurality of bent pieces circumferentially aligned and connecting the first annular part and the second annular part in the axial direction, and configured to allow each bent piece to move in a radial direction when undergoing resilient deformation, the bent pieces each functioning as the second lock engagement part.

8. A cam clutch comprising: a rotatably arranged first race member; a rotatably arranged second race member coaxial with the first race member; and a plurality of cams disposed between the first race member and the second race member, the first race member and the second race member being spaced away in an axial direction along a rotation axis of the first race member, the plurality of cams being disposed between the first race member and the second race member in the axial direction, the first race member and the second race member being arranged such as to be relatively movable closer to and away from each other in the axial direction, the cam clutch comprising a first race member unit having the first race member, and a second race member unit having the second race member, the second race member unit including a control member arranged on a rear side in the axial direction opposite from a front side facing the first race member such as to be movable in the axial direction relative to the second race member, and a bias unit biasing the second race member and the control member away from each other, the first race member unit including a first lock engagement part, the second race member unit including a second lock engagement part capable of engaging with the first lock engagement part, the second lock engagement part being configured to engage with the first lock engagement part such as to stop the control member from moving away from the first race member in the axial direction.

* * * * *